United States Patent [19]

Pfeffer

[11] 4,174,494

[45] Nov. 13, 1979

[54] ELECTRIC MOTORS CONTROL SYSTEM

[75] Inventor: Paul Pfeffer, Gomaringen, Fed. Rep. of Germany

[73] Assignee: Etablissements Carpano & Pons, France

[21] Appl. No.: 851,185

[22] Filed: Nov. 14, 1977

[30] Foreign Application Priority Data

Nov. 22, 1976 [CH] Switzerland ........................ 14640/76

[51] Int. Cl.[2] .............................................. H02P 1/00

[52] U.S. Cl. .......................................... 318/54; 318/65

[58] Field of Search ..................................... 318/54, 65

[56] References Cited

U.S. PATENT DOCUMENTS 1,919,525 7/1933 Nogosek ................................ 318/65

2,399,699 5/1946 Wahlberg ................................ 318/54

2,424,243 7/1947 Lowell ................................ 318/54 X

*Primary Examiner*—Benjamin Dobeck

*Attorney, Agent, or Firm*—Robert E. Burns; Emmanuel J. Lobato; Bruce L. Adams

[57] ABSTRACT

This system for controlling the operation of several electric motors notably for blinds and similar devices comprises a plurality of decentralized control devices each associated with one motor and controlled from a central control means via a common control line. Each decentralized control device comprises, for each direction of rotation of the motor concerned, a relay and, for each motor, control means connected in parallel to the common control line. The control means for each relay comprise a switch connecting the common line to the middle point of the pair of inverters controlling the two directions of rotation of the motor. The front contact of each inverter controls the energization of the corresponding relay and the back contact of each inverter controls the self-energization of the relay of the other inverter via a self-energization contact provided on the other relay.

5 Claims, 4 Drawing Figures

ELECTRIC MOTORS CONTROL SYSTEM

BACKGROUND OF THE INVENTION

The present invention relates to systems for controlling a plurality of electric motors for example in installations such as those designed for driving blinds or similar devices, which comprise decentralized control devices associated with each motor respectively, each connected to a supply network for the motors, and responsive to a central control device via a common control line. This central control device comprises a D.C. supply connected to switching means capable of emitting on the common control line orders intended for all the decentralized control devices for controlling either the rotation of the motors in one or the other direction, or the possibility of utilizing anyone of the decentralized control devices. Each decentralized control device comprises for each direction of rotation of the corresponding motor a relay and, for each motor, control means connected in parallel to the common control line. A pair of unidirectional devices consisting for example of diodes are disposed in the circuit connecting the common control line to the coil of the corresponding relay for preventing the passage of current in the direction from said coil to the common control line.

DESCRIPTION OF THE PRIOR ART

In known devices of this type such as the one disclosed in the West German Pat. No. 2.001.577, each decentralized control device comprises a single inverter. Thus, to each position of this inverter there corresponds a specific direction of rotation of the relevant motor. This inverter is designed for automatic resetting, and the relays of each decentralized control device are not designed for self-energization; these two features are such that the motor rotation, when controlled by one of the decentralized control devices, ceases when the corresponding inverter is released, which constitutes a shortcoming for the user who must therefore actuate this inverter until the motor driven elements have completed the movement contemplated.

DESCRIPTION OF THE INVENTION

With the control system according to the present invention this shortcoming is safely avoided. In fact, with the control system constituting the subject-matter of the present invention, the rotation of a motor in one or the other direction can be controlled by simply exerting a very short action on one of the two inverters of the corresponding decentralized control device. Moreover, this result is obtained while precluding any possibility of damaging the relay contacts in case the user actuated one of the inverters of one of the decentralized control devices while the corresponding motor still rotates in a direction of rotation corresponding to an actuation of the other inverter of the same decentralized control device.

In the control system according to this invention the means for controlling each motor comprise a switch connecting the common control line to the middle point of the pair of inverters provided for controlling the two directions of rotation of the motor concerned; the front contact of each inverter is connected with a view to control the energization of the corresponding relay, and the back contact of each inverter is connected with a view to control the self-energization of the relay corresponding to the other inverter via a self-energization contact provided on this relay.

According to a typical form of embodiment of this invention, the energization of anyone of the two relays of each decentralized control device takes place via a back contact of the other relay.

Advantageously, the component elements of the decentralized control device are mounted on a printed circuit; it is also possible to mount this printed circuit behind a cover supporting the inverters in a double casing, and to house the component elements mounted on said printed circuit in this double casing.

DESCRIPTION OF THE PREFERRED EMBODIMENT

Figure 1:
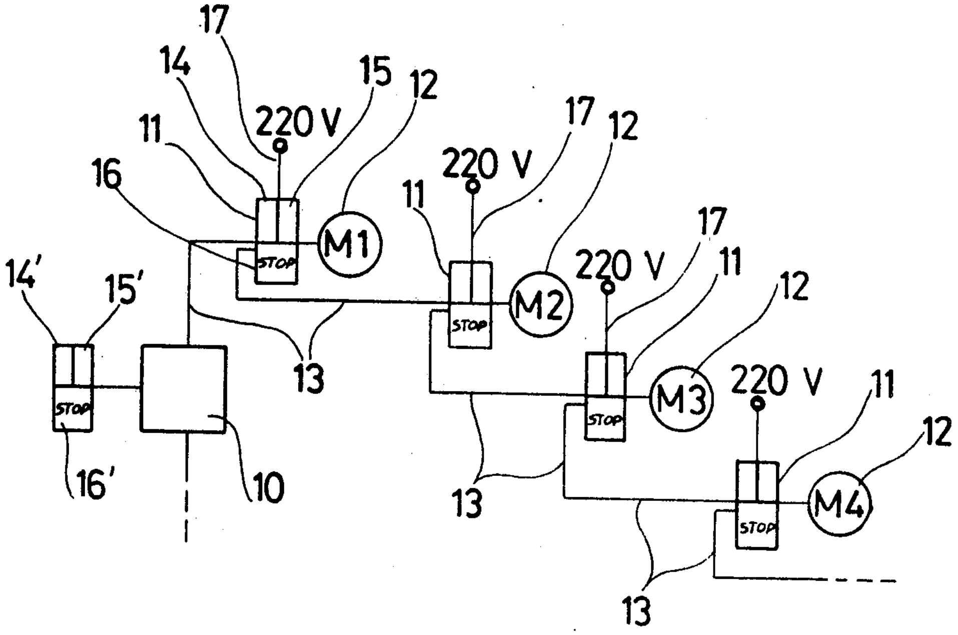
FIG. 1 illustrates diagrammatically a typical form of embodiment of a control system according to the teachings of this invention.

The control system illustrated in FIG. 1 of the drawing comprises central control means 10 and a plurality of decentralized control devices 11 to which a motor and reduction unit 12 is connected. This motor and reduction unit 12 may be utilized for example in sun protection systems, such as blinds, and in various other closing means. All the decentralized control devices 11 are connected to the central control system 10 through a simple circuit 13 comprising in this case four wires. As clearly shown in FIG. 1, each decentralized control device comprises an inverter 14 for one direction of rotation and another inverter 15 for the other direction of rotation of the motor, together with a stop switch 16 effective for each direction of rotation. Moreover, each decentralized control device is supplied with current via a cable 17. The central control means 10 is provided like the decentralized control device 11 with an inverter 14' for one direction of rotation and another inverter 15' for the other direction of rotation of all the motors, and also with a stop switch 16'.

Figure 2:
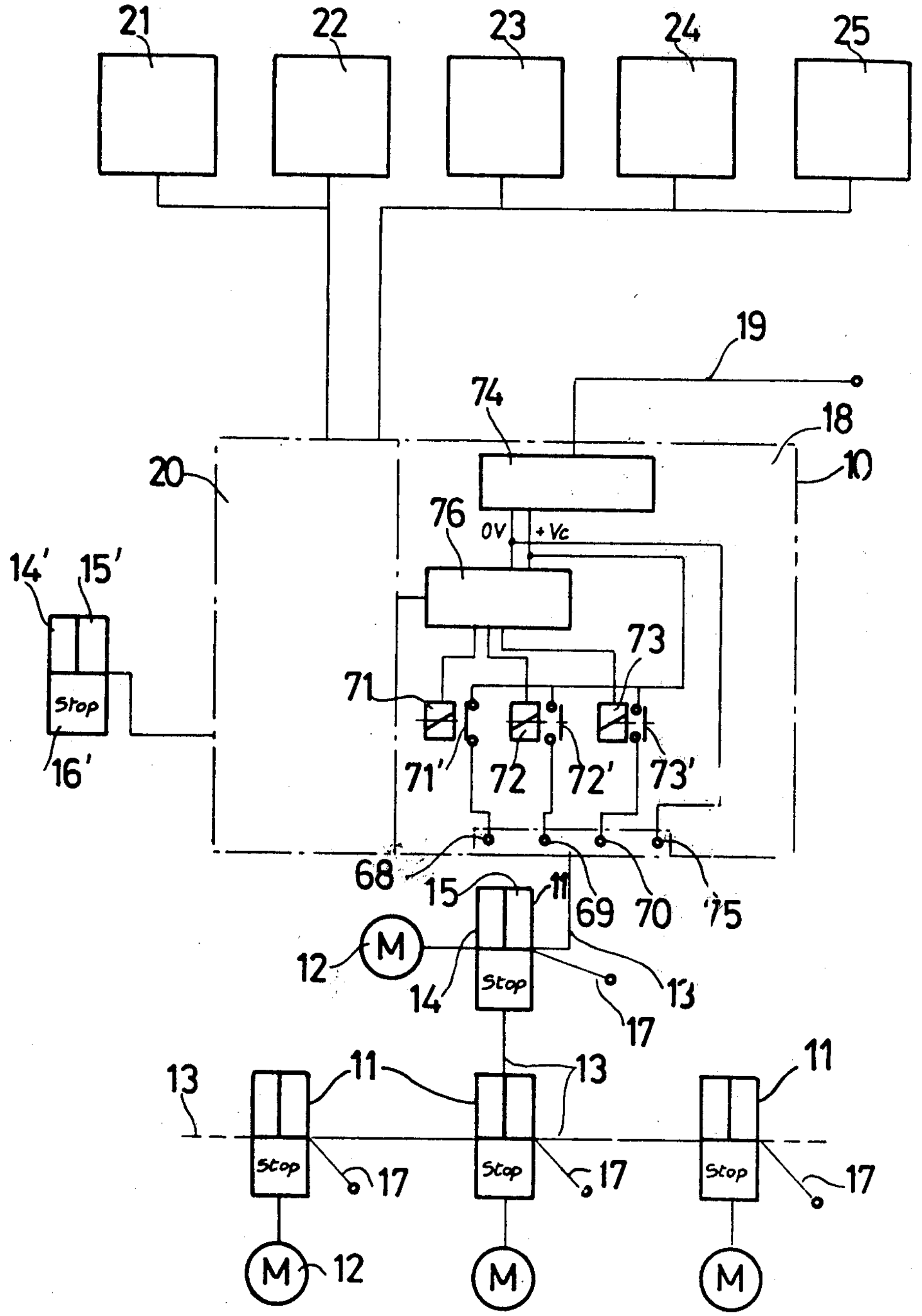
FIG. 2 illustrates diagrammatically and more in detail the same form of embodiment of the control system of this invention.

As clearly shown in FIG. 2, the central control means 10 comprises essentially a block 20 and another block 18.

The block 20 of central control means 10 consists of a combination of logic circuits adapted to determine a priority in case several orders were delivered simultaneously to said block 20 either from manually-operated inverters 14', 15' and switch 16', or from automatic means such as wind-responsive sensors 21, smoke or fire sensors 22, solar cells 23, a clock 24 and/or a rain sensor 25. All these control elements are connected to block 20.

Block 18 comprises a D.C. supply 74 connected to an A.C. supply mains 19. On the other hand, this D.C. supply 74 is connected to a time-lag device 76, via its 0-Volt output to a terminal 75 and via its +Vc output to terminals 68, 69 and 70 through the medium of contacts 71', 72' and 73', respectively, of relays 71, 72 and 73. The time-lag device 76 is connected to the coils of relays 71, 72 and 73. It is also connected to the logic circuits block 20. Contact 71' is a back contact and contacts 72' and 73' are front contacts.

Figure 3:
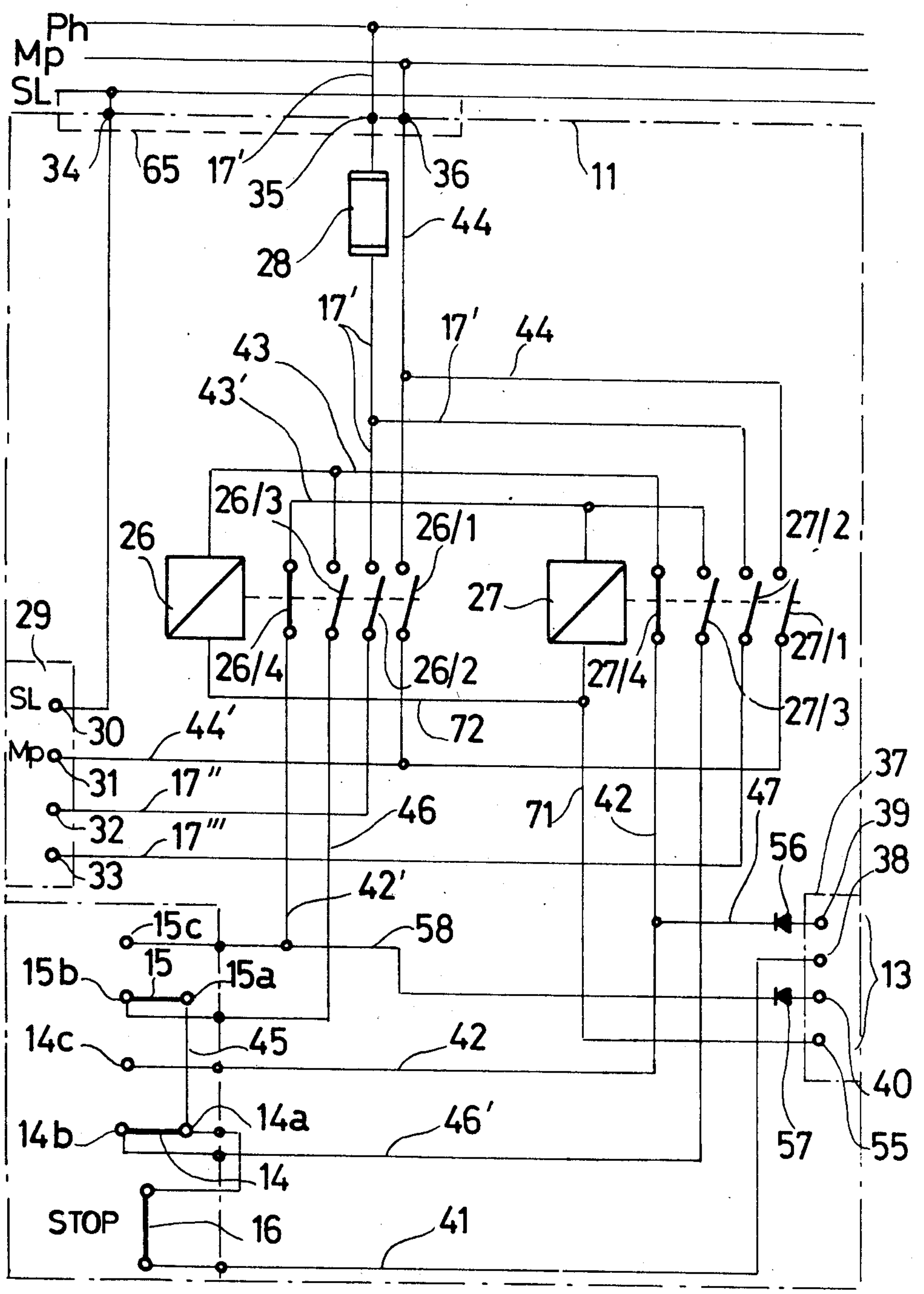
FIG. 3 illustrates diagrammatically one of the decentralized control devices incorporated in the control system.

FIG. 3 illustrates the switching means incorporated in a decentralized control device 11. It comprises, in addition to inverters 14, 15 and switch 16, a pair of relays 26 and 27 adapted to control the two directions of rotation of the corresponding motor 12 for which a terminal strip 29 is provided. This terminal strip 29 comprises a grounding input 30, another input 31 for the middle point of the motor, and inputs 32 and 33 for the two directions of rotation of the motor, respectively. The terminal strip 65 for connecting the decentralized control device to the supply mains comprises a terminal 34 for a ground connection SL, a terminal 35 connected on the one hand to the fuse 28 via conductor 17' and on the other hand to one phase Ph of the mains, and finally a terminal 36 connected to another phase Mp of the mains.

Each relay 26 and 27 has three front contacts 26/1, 26/2, 26/3, and 27/1, 27/2, 27/3 respectively, as well as a back contact 26/4, 27/4 respectively. Terminal 31 is connected via conductor 44', parallel-connected front contacts 26/1 and 27/1, and a conductor 44 to terminal 36. Terminal 32 is connected via conductor 17'', front contact 26/2 and conductor 17' to terminal 35. Terminal 33 is connected to the same terminal 35 via conductor 17''', front contact 27/2 and conductor 17'. Terminal 30 is connected directly to terminal 34. Contacts 26/3 and 27/3 are connected on the one hand to back contacts 15*b* and 14*b* of inverters 15 and 14, respectively, via conductors 46 and 46', respectively. On the other hand, contact 26/3 is connected to the coil of relay 26 and contact 27/3 is connected to the coil of relay 27. Contacts 26/3 and 27/3 are thus utilized as self-energizing or holding contacts. Back contact 26/4 is connected on the one hand via conductor 42' to the front contact 15*c* of inverter 15 and on the other hand via conductor 43' to the coil of relay 27. The back contact 27/4 is connected on the one hand to front contact 14*c* of inverter 14 via conductor 42, and on the other hand to the coil of relay 26 via another conductor 43. These back contacts 26/4 and 27/4 act as safety means preventing any simultaneously energization of the two relays.

A terminal strip 37 of decentralized control device 11 comprises three terminals 38, 39, 40 and 55 to which control circuit 13 is connected. The first terminal 38 is connected on the one hand to the middle points 15*a* and 14*a* of inverters 15 and 14, respectively, via conductor 41, stop switch 16 and another conductor 45. It is also connected to the terminal 68 of block 18. Terminal 55 is connected on the one hand to the coils of relays 26 and 27 via conductors 71 and 72, and on the other hand to terminal 75 of block 18. Terminals 39 and 40 correspond each to one direction of rotation of the motor. Terminal 39 is connected to the anode of a diode 56 having its cathode connected to the front contact 14*c* of inverter 14 via conductors 47 and 42. Terminal 40 is connected to the anode of a diode 57 having its cathode connected to the front contact 15*c* of inverter 15 via a conductor 58. Externally of the decentralized control device 11 the terminals 39 and 40 are connected to the terminals 69 and 70 of block 18, respectively (FIG. 2). Both diodes 56 and 57 impart a unidirectional characteristic to conductors 47 and 58, thus preventing any information from control 14 or 15 from being retransmitted along line 13.

Thus, an order deriving for instance from a manual actuation of inverter 14' will pass through the block 20 and energize the time-lag device 76. Both relays 71 and 72 are energized. All the relays 26 are then energized via conductor 43, contacts 27/4, conductors 42 and 47, terminal 39, line 13, terminal 69, contact 72', and all the motors 12 are energized for rotation in a given direction via contacts 26/1 and 26/2.

During the same time period, since contact 71' is open, the middle points 14*a* and 15*a* are no more connected to the output +Vc of supply circuit 74, and actuating any one of inverters 14, 15 or 16 will not produce any effect until the time-lag period is completed.

A stop order given for example by switch 16' will cut-off this time-lag instantaneously. Relays 26 are no more energized, contacts 26/1 and 26/2 open, and motors 12 are stopped. Similarly, another order issued by subsequently actuating the inverter 15' will energize relays 71 and 73. Then all the relays 27 are energized and all the motors are also energized for rotation in the opposite direction via contacts 27/1 and 27/2. In case this actuation of inverter 15' followed an actuation of inverter 14' before the time-lag period is completed, this actuation would firstly cancel the time-lag and then start another cycle.

Besides, an order resulting from a manual actuation of one of inverters 14 will energized relay 26 via conductor 42, contact 27/4, conductor 43, corresponding to the motor 12 concerned. Then, this relay 26 will be self-energized via back contact 15*b*, conductor 46 and contact 26/3. The motor energized through contacts 26/1 and 26/2, will rotate in a given direction as long as the limit-switch associated with this motor cuts off the energization of this motor.

After the first actuation of inverter 14, whether the motor is stopped or running, any manual actuation of the corresponding inverter 15 will during a first time discontinue the self-energization of relay 26 which was obtained through contact 15*b*, and during a second time discontinue the energization of relay 27 via conductor 42', contact 26/4 and conductor 43'. Then this relay 27 will become self-energized via back contact 14*b*, conductor 46' and contact 27/3. The motor will thus rotate in the opposite direction, with contacts 27/1 and 27/2 closed.

A "stop" order issuing from switch 16 will discontinue the self-energization of the relay, for example relay 27, that was still energized. Contacts 27/1 and 27/2 now open and the motor is no more energized.

Figure 4:
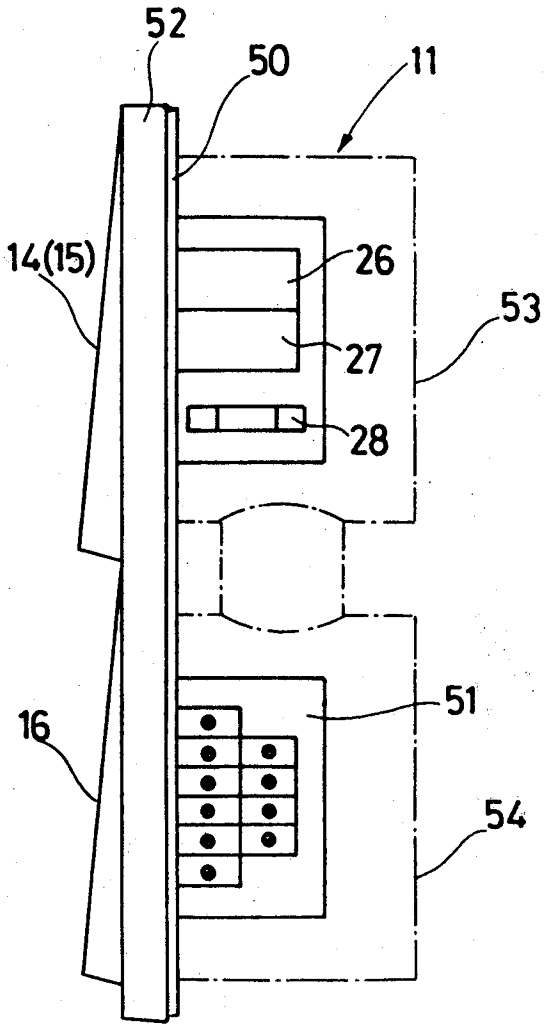
FIG. 4 illustrates in side elevational view one of the decentralized control devices incorporated in the control system of this invention.

FIG. 4 illustrates diagrammatically a typical example on scale 1:1 of the size obtainable for the decentralized device 11 with the connections illustrated in FIG. 3. All the connections are assembled in a printed circuit 50 and all the strips 29, 34 and 37 illustrated in FIG. 3 are assembled to constitute a unitary structure 51 secured to the printed circuit.

This printed circuit 50 is secured behind the case 52 acting as a cover to a pair of current-type, manually-operated switches 53 and 54 on which the pair of inverter keys 14 and 15 are mounted side by side (in this case, with key 14 concealing key 15) above the switch key 16. Also disposed on printed circuit 50 are the fuse 28 and the pair of relays 26 and 27, the relays being inserted into the casing 53 after enclosing the assembly 51 in casing 54.

The control system according to this invention is applicable in all cases wherein it is desired to control either individually the rotation of motors operatively connected for example to a rolling shutter, or in a combined manner the simultaneous rotation of several such motors.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed is:

1. A system for controlling a plurality of reversible electric motors for driving blinds or similar devices, said system comprising:
   a plurality of reversible electric motors each connected with and driving a blind or similar device and each having a plurality of terminals comprising a first terminal for rotation of the motor in a first direction, a second terminal for rotation of the motor in a second direction and a common terminal,
   central control means comprising a first central inverter actuatable for rotation of all of said motors in a first direction, a second central inverter actuatable for rotation of all of said motors in a second direction, and a central stop switch actuatable for stopping all of said motors,
   a common power line for supplying power to all of said motors, and
   a plurality of local control means, one for each of said motors, each of said local control means comprising:
   a first local inverter actuatable for rotation of the respective motor in a first direction, a second local inverter actuatable for rotation of said motor in a second direction, and a local stop switch for stopping said motor,
   a first relay having an operating coil and operable to connect said first terminal and said common terminal of the respective motor with said power line for rotation of said motor in said first direction, and a second relay having an operating coil and operable to connect said second terminal and said common terminal with said power line for rotation of said motor in said second direction,
   means connecting the operating coil of said first relay with said first local inverter of the respective local control means and with said first central inverter, and means for connecting the operating coil of said second relay with said second local inverter and with said second central inverter, whereby said first and second relays are actuatable alternatively from said central control means and said local control means, the connections of said operating coils of said first and second relays with said central inverters including unidirectional current means to prevent feed-back from said local control means to said central control means or the local control means of other motors, and
   means connecting the respective local stop switch and said central stop switch with both said first and second relays for stopping the respective motor upon actuation of either said local stop switch or said central stop switch, whereby all of said motors can be operated in either direction and stopped from the said central control means and each of the individual motors can be operated in either direction or stopped from the respective local control means without feed-back to the central control means or to other motors.

2. A control system according to claim 1, in which each of said first and second relays includes a normally open holding contact for holding said relay when said operating coil is energized, and in which said local and central stop switches are connected with said hold contacts to release said relays upon actuation of either of said stop switches.

3. A control system according to claim 1, in which each of said first and second relays includes a normally closed safety contact and in which said connecting means includes connections between said safety contact of said first relay and said operating coil of said second relay and between said safety contact of said second relay and said operating coil of said first relay to prevent simultaneous energization of said first and second relays.

4. A control system according to claim 1, in which each of said local control means comprises a support on which said inverters and stop switch are mounted, said stop switch and each of said inverters comprising an operating key on the front of said support, said relays and a printed circuit comprising said connecting means being mounted behind said support.

5. A control system according to claim 1, further comprising at least one sensor of ambient conditions and means connecting said sensor with said central control means for control of operation of said motors in accordance with the condition sensed.

* * * * *